April 17, 1928.
D. B. TAGGART
GRAIN CRACKING MACHINE
Filed Aug. 10, 1927
1,666,798
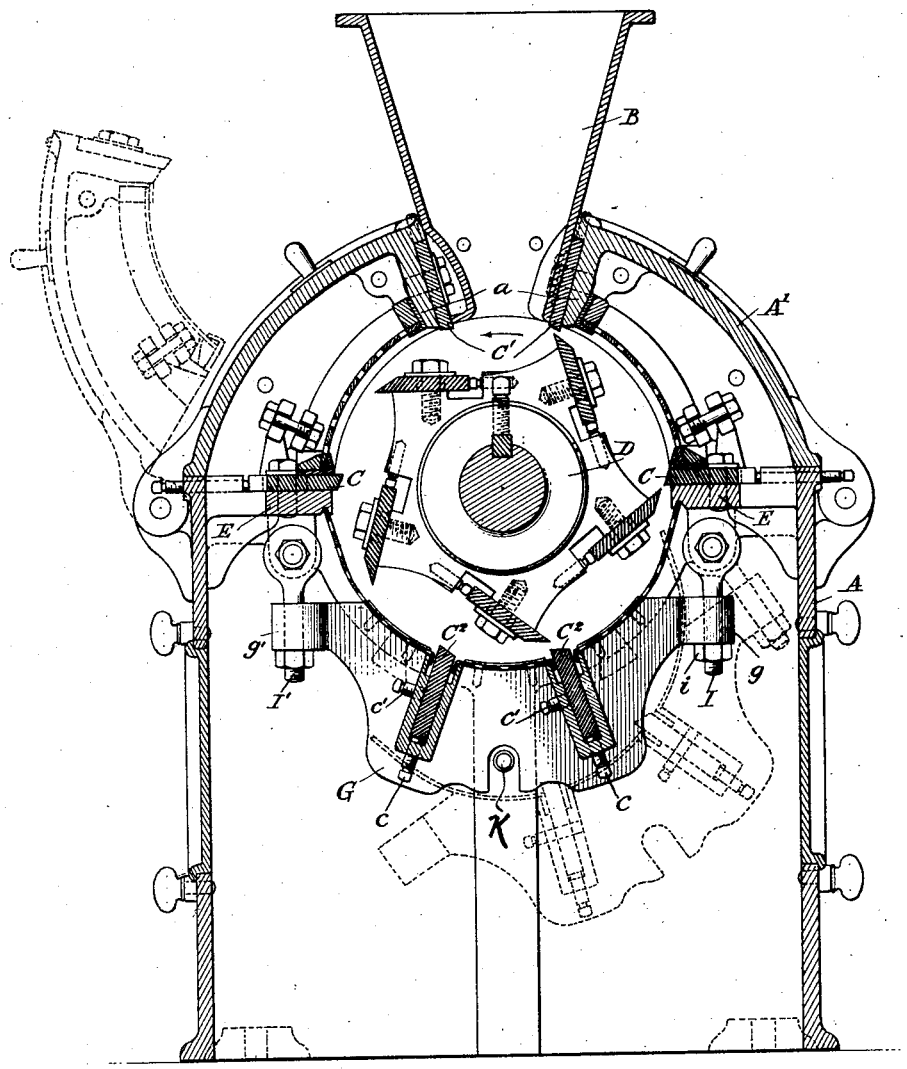
INVENTOR.
Daniel B. Taggart
BY Dowell & Dowell
his ATTORNEYS Patented Apr. 17, 1928.

1,666,798

UNITED STATES PATENT OFFICE.

DANIEL B. TAGGART, OF MUNCY, PENNSYLVANIA, ASSIGNOR TO SPROUT, WALDRON AND COMPANY, OF MUNCY, PENNSYLVANIA, A CORPORATION OF PENNSYLVANIA.

GRAIN-CRACKING MACHINE.

Application filed August 10, 1927. Serial No. 212,127.

This invention relates to grain cracking or reducing machines, and more particularly to machines of the type shown in patent to Simon Snyder, assignor, No. 1,560,433, dated November 3, 1925, Reissue No. 16,759, dated October 4, 1927, for improvements in grain cracking or reducing machines.

In the patented machine there is a casing having a feed hopper thereon and a rotary cutter or rotary knife-blades therein and stationary knives on opposite sides thereof arranged in cooperative relation to the rotary knives, and a screen encircling the rotary knives and having the upper part thereof spaced from the inner wall of the casing so as to provide suitable space in the upper part of the casing to receive material thrown outwardly by the rotary knives and caused to descend by gravity into the lower part of the casing, while the lower part of the screen extends across an open space below the rotary knives, so that suitable spaces are provided above and below the rotary cutter to receive material thrown out by the rotary knives, and I therefore do not broadly claim any such construction.

The objects of my invention are to provide means whereby the capacity and efficiency of machines of the character referred to is increased, while the quantity of meal or undesired product ordinarily produced in using such machines is reduced.

The invention will first be hereinafter more particularly described, with reference to the accompanying drawings, which are to be taken as a part of this specification, and then pointed out in the claims at the end of the description.

Said drawing illustrates a vertical sectional elevation of a machine embodying my invention; the cradle for the lower knives, which are arranged below the rotary cutter, being shown in full lines in normal position and indicated by dotted lines in lowered position to afford access to the rotary knives and the lower stationary knives and screen sections.

Referring to said drawing, the machine casing may be of the form shown or any suitable construction having a lower or base member A and an upper member or members $A^1$ and a feed hopper B thereon; said casing having secured therein a series of stationary knives C, $C^1$, arranged in spaced relation above and on opposite sides of a rotary cutter D, as in the machine hereinbefore referred to; other stationary knives being arranged below the rotary cutter so as to provide a circular series of stationary knives arranged in spaced relation around the rotary knives which are also preferably arranged in circular series. But the number of knives may be increased or diminished and they may be arranged in various positions, provided there are stationary knives above and below the rotary cutter and preferably on opposite sides thereof. The rotary knives are encircled by a screen which, as shown, is formed in sections spaced from the inner walls of the casing so as to provide suitable spaces or chambers above and below the rotary cutter to receive material thrown out by the rotary knives; such material being caused to descend by gravity into the lower part of the casing. As shown, the stationary knives are adjustably secured in fixed positions between adjacent sections of a sectional screen which encircles the rotary cutter; the horizontal knives C being adjustably secured to knife-supports E secured within the lower casing member, while the uppermost knives $C^1$ are secured in recesses provided therefor between the lower end of the feed hopper and depending flanges $a$ on the upper casing member or members. The upper sections of the screen may be removably secured and are made easily accessible by the means shown or any suitable means, so that a broken or worn part may be readily removed and replaced, but inasmuch as such means are not claimed as of my invention it appears to be unnecessary to specifically describe the same. In connection with the rotary knives and stationary knives about the same I provide means for attaching a stationary knife or knives with associated screen sections and means for supporting the same below the rotary knives, which I will now proceed to describe.

An oblong cradle-like frame structure G extends across the lower casing member, below the rotary cutter, and carries stationary knives $C^2$, which are adjustably fitted in sockets provided therefor on opposite sides of the center of the cradle; each knife being slidably fitted in its socket and secured in a fixed position therein by means of adjustable screws $c$ and $c^1$; the screws bearing on the back of the knife while the screws $c^1$ bear on one side thereof. The cradle G is hinged or pivotally secured to the casing at one side and detachably secured at the other side, so that it may be lowered to the position indicated in dotted lines to afford access to the knives and screen sections mounted thereon and to the rotary cutter, and to this end opposite end-portions of the cradle are provided with lugs or projections $g$ and $g^1$ to receive fastening bolts for securing the cradle in proper position. The lugs $g$ are apertured to receive pendant bolts I which are pivotally supported at one side of the casing, while the lugs $g^1$ are provided with open-ended slots to receive pendant bolts $I^1$ pivotally supported at the opposite side of the casing, said bolts having nuts screwed thereon, so that the cradle may be adjusted vertically and secured in a fixed position. The open-ended slots in the lugs $g^1$ adapt the bolts $I^1$ to be turned on their pivots so as to release the cradle and allow it to be lowered to the dotted line position shown, to afford access to the rotary cutter, or to the stationary knives and screen sections arranged below the cutter. To firmly support the cradle in normal position and adapt it to resist pressure thereon due to the accumulation of grain or other material between the rotary cutter and the lowermost stationary knives, open-ended slots may be formed in the end-pieces of the cradle to receive fastening bolts or screws K inserted through apertures in opposite ends of the casing and engaging apertures or open-ended slots in the end-pieces of the cradle.

Having thus described my invention, what I claim as new and desire to secure by Letters Patent of the United States is:

1. The combination, in a machine of the character described, of a casing having a shaft revolubly mounted therein carrying rotary knives, stationary knives projecting inwardly from the casing into operative relation to the rotary knives, a stationary knife or knives supported below said rotary knives, and a screen encircling the rotary knives and spaced from the casing above and below said shaft so as to provide a suitable space around the knives into which material may be thrown and caused to pass by gravity into the lower part of the casing.

2. In a machine of the character described, a casing having a feed hopper mounted thereon and a rotary cutter journaled therein, stationary knives arranged in co-operative relation to the rotary cutter, including a plurality of knives arranged below the rotary cutter, and a screen encircling the rotary knives and spaced from the casing so as to provide suitable spaces above and below the rotary knives to receive material thrown out by the rotary cutter.

3. In a machine of the character described having rotary and stationary knives arranged in co-operative relation within an enclosing casing, a cradle-like frame structure extending across the casing below the rotary knives and carrying stationary knives arranged in co-operative relation to said rotary knives, and a screen encircling the rotary knives and spaced from the casing so as to provide suitable spaces above and below the rotary knives to receive material thrown out by the latter; said frame-structure being hinged at one side of the casing and releasably secured at the other side thereof.

4. In a machine of the character described having rotary and stationary knives arranged in co-operative relation within an enclosing casing, a cradle-like frame-structure extending across the casing below the rotary knives and carrying stationary knives arranged in co-operative relation to said rotary knives, and a screen encircling the rotary knives and spaced from the casing so as to provide suitable spaces above and below the rotary knives to receive material thrown out by the latter; said frame-structure being hinged at one side of the casing and releasably secured at the other side thereof by means adapted to hold the frame-structure in a fixed position; said means including supporting devices on the casing releasably engaging opposite ends of the frame-structure.

5. In a machine of the character described, a rotary cutter and stationary cutters arranged in co-operative relation within an enclosing casing; said cutters including a stationary cutter arranged below the rotary cutter, and a screen encircling the rotary cutter and spaced from the casing so that suitable spaces are provided above and below the rotary cutter to receive material thrown out by said rotary cutter.

6. A grain cracking or reducing machine comprising a casing having a rotary cutter therein and stationary cutters arranged in co-operative relation to the rotary cutter, including a stationary cutter arranged below the rotary cutter, means for supporting the last named stationary cutter in normal position and for lowering the same into inoperative position to afford access thereto or to the rotary cutter, and a screen encircling the rotary cutter and spaced from the casing so that suitable spaces are provided above and below the rotary cutter to receive material thrown out by the latter cutter.

In testimony whereof I affix my signature.

DANIEL B. TAGGART.

CERTIFICATE OF CORRECTION.

Patent No. 1,666,798.  Granted April 17, 1928, to

DANIEL B. TAGGART.

It is hereby certified that error appears in the printed specification of the above numbered patent requiring correction as follows: Page 1, line 95, for the word "about" read "above"; page 2, line 1, after the word "screws" insert the reference character "c"; and that the said Letters Patent should be read with these corrections therein that the same may conform to the record of the case in the Patent Office.

Signed and sealed this 29th day of May, A. D. 1928.

(Seal)

M. J. Moore,
Acting Commissioner of Patents.